(No Model.)
B. KANABLE.
SAMPLE CREAM EXTRACTOR.
No. 397,004. Patented Jan. 29, 1889.
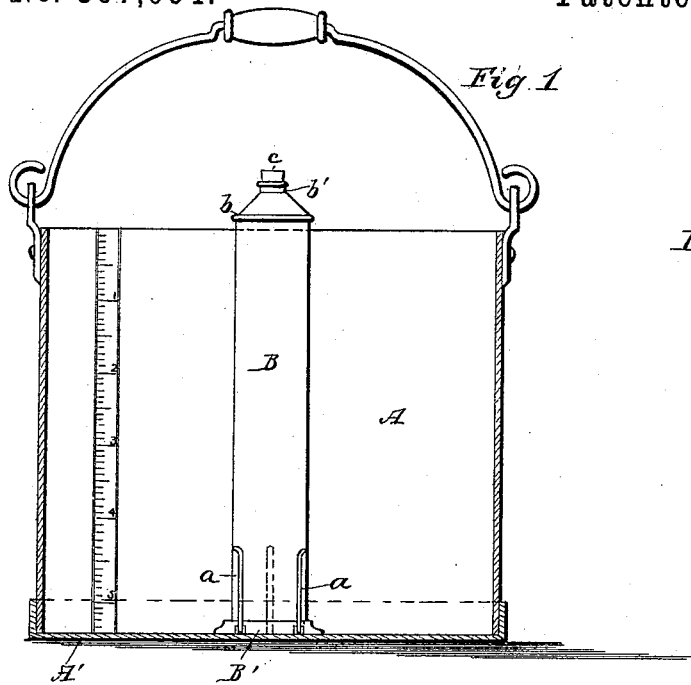
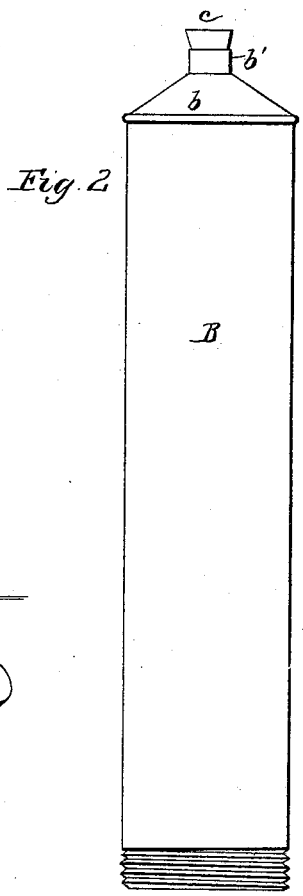
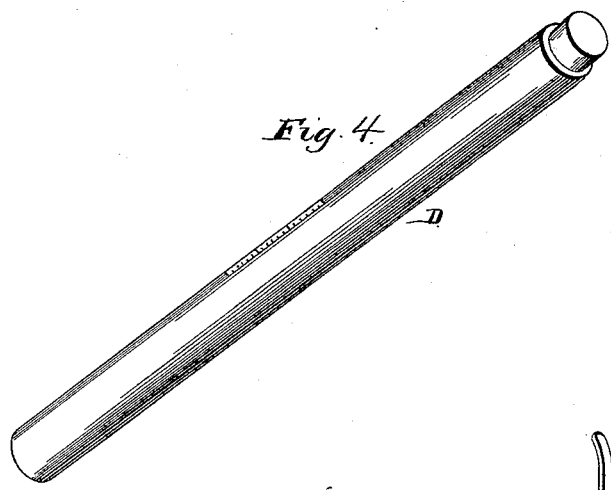
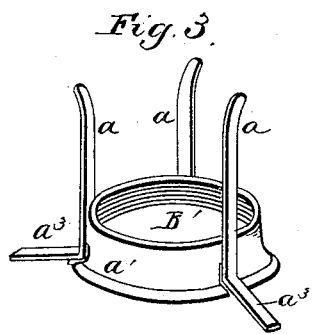
Witnesses.
G. F. Downing
V. E. Hodges
Inventor
Byron Kanable
By his Attorneys
Seggett and Seggett

UNITED STATES PATENT OFFICE.

BYRON KANABLE, OF MARION, OHIO.

SAMPLE-CREAM EXTRACTOR.

SPECIFICATION forming part of Letters Patent No. 397,004, dated January 29, 1889.

Application filed March 23, 1888. Serial No. 268,316. (No model.)

*To all whom it may concern:*

Be it known that I, BYRON KANABLE, of Marion, in the county of Marion and State of Ohio, have invented certain new and useful Improvements in Sample-Cream Extractors; and I do hereby declare the following to be a full, clear, and exact description of the invention, such as will enable others skilled in the art to which it appertains to make and use the same.

This invention relates to an improved device for extracting a sample of cream from a creamery-pail or other gaged vessel in which cream has been deposited, the object being to provide a convenient, simple, and portable implement, by the use of which a portion of the cream contained in a creamery-pail may be obtained without disturbing the contents of the pail by stirring it, so as to enable an operator to obtain a true sample of the stratified contents of the pail or other vessel in which the cream has been deposited.

In division A of several applications filed by me March 21 and March 23, 1888, and numbered, respectively, 267,989 and 268,241, to protect a novel process and apparatus, which will accurately determine the exact amount of oil contained in a known quantity of cream, which is a unit of measure or weight of a larger known quantity of cream, so that the oily richness and consequent commercial value of the larger body of cream may be definitely ascertained, I have claimed a process in which the initial step consists in the removal of a sample of cream from a creamery-pail or other vessel of known capacity, so as to obtain the cream in a stratified condition without stirring the contents of the pail.

The device I exhibit and describe in the process claimed as a preferred means for obtaining such a sample of the cream I have reserved the right to protect by a divisional application. Said device therein shown is identical with the subject of my present application for patent.

In consideration of the foregoing statement my present invention consists in the construction of a sample-cream extractor in a novel manner, and its use in combination with a creamery-pail or other vessel of known capacity, as will be more specifically described in the following specification, and pointed out in the claims.

Referring to the drawings making a part of this specification, Figure 1 is a side elevation, in section, of a creamery-pail, together with a sample-extractor tube in position in the pail. Fig. 2 is an enlarged view of the tubular shell of the sample-extractor removed from its bottom. Fig. 3 is an enlarged view of the attachable bottom of the sample-extractor. Fig. 4 represents a test-tube of preferred form, which is adapted to receive a portion of the contents of the sample-extractor after they have been removed and shaken up to render them homogeneous.

The creamery-pail A, usually employed to contain cream, is preferably made cylindrical, of a proper height and diameter to contain a certain number of gallons or pounds of cream, and should be constructed of metal that is coated with non-oxidizing metal to prevent rust and facilitate the cleansing of the vessel. It may be explained that one of these creamery-pails is taken along with a "routeman" when he makes his round for collection of cream, and the producer's cream is poured into this pail, which may have a graduated scale on its interior side surface to show the exact amount in gallons and fractions thereof, so that the exact quantity will at once be indicated. The pails of known dimensions are furnished with the usual bail to render them portable. The shell of the sample-extractor B is preferably made cylindrical and of sheet metal that is protected from oxidation.

The size of the extractor-shell B should be such that it will hold sufficient liquid to charge a test-tube, D. (See Fig. 4.) The shell B is threaded at its lower end upon the outer surface, and the upper end conically contracted to receive the ferrule or neck-flange $b'$, which is secured to the upper portion of the conical head $b$, and is furnished with a cork, $c$, or other preferred means of temporarily closing this end of the tube to prevent the entrance of flies or other insects when the instrument is not in use.

Within the creamery-pail A, about the center of its bottom A', three or more guide-fingers, $a\ a\ a$, are attached by soldering their extended ends $a^3$ to the same; or, if preferred, the fingers may be riveted fast to insure stability. The upright portions of the fingers $a$ are slightly curved toward the vertical wall of the pail, as shown in Fig. 1. Between the fingers $a$, which are separated a proper spaced distance, the bottom piece, B', is removably secured, the edge of the same being notched, preferably, to slide down over the fingers $a$, which will prevent a rotation of the bottom piece and permit it to be freely lifted upward. The bottom piece, B', has its peripheral edge provided with an upwardly-turned flange, $a'$, that is of such a proportionate inner diameter that the thread cut in it will fit neatly the threaded lower end of the tubular shell B, so that the shell B, which is introduced between the guide-fingers $a$ by a vertical downward movement, may be inserted into the threaded bottom by a rotation of the shell after it impinges upon the upper edge of the flange $a'$, and when the threads are fully engaged the entire device may be lifted out of the creamery-pail.

It is apparent that if one of the bottoms B' is inserted in place in each creamery-pail previous to the filling of the same with cream by a producer of such product one tubular sample-extractor shell B will answer to extract samples of cream from any number of filled creamery-pails, as each loose bottom piece, B', which is placed in position between the guide-fingers $a$ of the pail before the pail is filled, will be ready for engagement by the tubular shell B when it is inserted through the stratified contents of the pail to receive a correct sample of the rich and poor cream that assumes different positions in the body of the pail, in proportion to its relative density, that which is richest in oil being nearest the top surface of the liquid mass.

When the device herein described is to be used, the shell B is vertically inserted into the cream in the creamery-pail A, care being taken to prevent a lateral disturbance of the cream, and when the bottom is reached and attached to the lower edge of the shell B', as has been previously explained, the sample extractor with its contents may be lifted clear of the creamery-pail, so that a true sample of the entire contents of a creamery-pail, or other vessel of known dimensions that is used to receive a producer's cream, may be obtained in this manner.

Having fully described my invention, what I claim as new, and desire to secure by Letters Patent, is—

1. In a sample-cream extractor, the combination, with a cream-receptacle having guide-fingers secured to the bottom thereof, of a tubular shell having a removable bottom, the latter adapted to be held in position to engage the open end of the tubular shell by the guide-fingers.

2. In a sample-cream extractor, the combination, with a cream-receptacle that is of known capacity, and guide-fingers attached to the inner surface of its bottom, of a loose bottom which is adapted to engage and become a part of a tubular sample-extractor, and a tubular sample-extractor shell, substantially as set forth.

In testimony whereof I have signed this specification in the presence of two subscribing witnesses.

BYRON KANABLE.

Witnesses:
A. P. COPELAND,
JAMES CULBERTSON.